March 7, 1933.  B. McCOLLUM  1,899,970
SEISMIC EXPLORATION OF GEOLOGIC FORMATIONS
Filed July 14, 1931  2 Sheets-Sheet 1

BURTON McCOLLUM
*INVENTOR.*

BY Ira J. Adams

*ATTORNEYS.*

March 7, 1933.  B. McCOLLUM  1,899,970
SEISMIC EXPLORATION OF GEOLOGIC FORMATIONS
Filed July 14, 1931   2 Sheets-Sheet 2
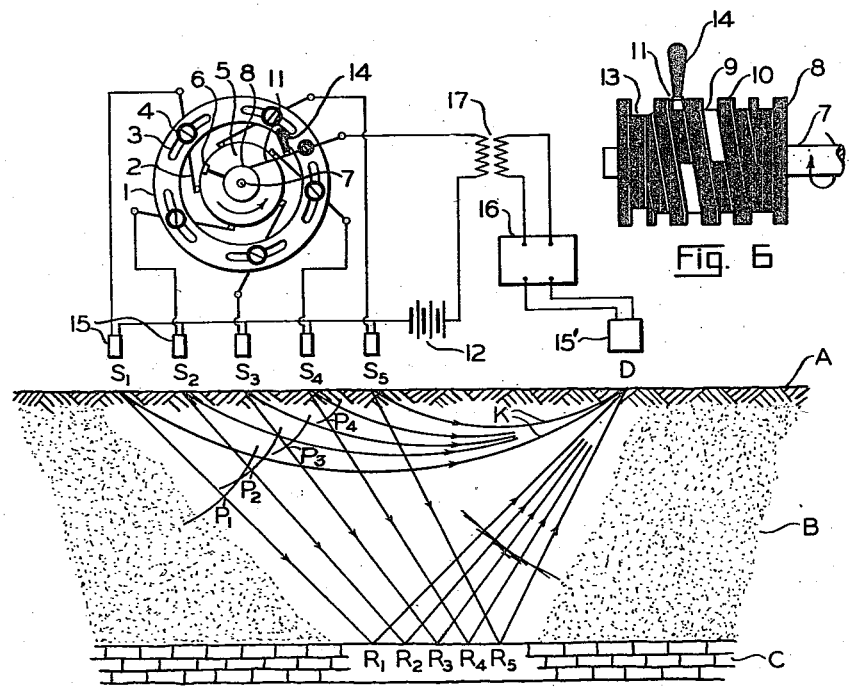
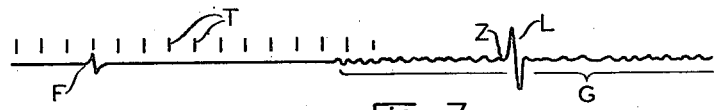
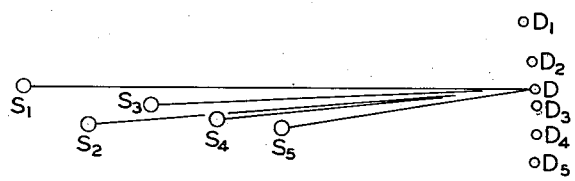
BURTON McCOLLUM
INVENTOR.
BY Ira J. Adams
ATTORNEYS.

Patented Mar. 7, 1933

1,899,970

UNITED STATES PATENT OFFICE

BURTON McCOLLUM, OF HOUSTON, TEXAS, ASSIGNOR TO McCOLLUM GEOLOGICAL EXPLORATIONS, INC., OF HOUSTON, TEXAS, A CORPORATION OF DELAWARE

SEISMIC EXPLORATION OF GEOLOGIC FORMATIONS

Application filed July 14, 1931. Serial No. 550,680.

My invention relates to a geophysical method of investigating geologic formations. More specifically, my invention consists in a seismic method for locating subterranean geologic formations, determining their depth, and profiling their surfaces.

Such investigation of the subsurface structure of the earth is desirable in locating and developing mineral deposits such as oil, ore, etc. This arises from the fact that such deposits are usually developed by means of drill holes, shafts or drifts which can be more efficiently and accurately located when the position and configuration of the deposits are known.

Another application of my method consists in locating bed-rock for building foundations, bridge piers, etc. It will be obvious, of course, that the invention has further and other applications where it is desirable to determine the depth and profile of a subterranean formation.

It is a well known physical principle that when an elastic wave is incident on the boundary surface between two media of different density and elastic properties, more or less of the wave energy is reflected. This principle of reflection has been utilized for some time in the exploration of subsurface formations.

Fig. 5 illustrates my improvement whereby waves sent out may be received at the receiving or detecting point so as to accentuate the difference between the record of the indirect as compared to the direct waves.

Fig. 6 is a view of the commutator or switch.

Fig. 7 is a record made in the system shown in Fig. 5.

Fig. 8 shows an alternative plan in which the source of the seismic waves are not located in the same line passing through the receiving point or points.

Figure 1:
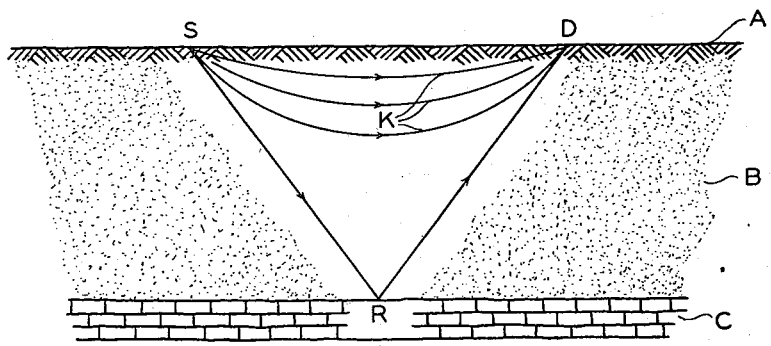
Fig. 1 illustrates the paths taken by waves that pass directly and indirectly from a single source of seismic waves to a receiving point.

A method of utilizing the principle is shown in Figure 1. Here, the thin weathered surface of the earth is designated by A, a hard consolidated stratum by C, and intervening formations by B. A source of seismic waves is located at S. This source may be a buried charge of dynamite which will set up seismic waves when exploded, or it may be other means, such as an elevated weight which will produce the same effect when dropped on the earth. When the source operates at the point S seismic waves will originate at this point and will be transmitted in all directions through the surrounding geologic formations. If a detector of seismic waves is located at the point D it will be actuated by the seismic waves arriving at that point, most of which will arrive over the direct paths K. In general there will be numerous paths K, as the formation B will be more or less stratified and the elasticity and density will vary, depending on the composition and depth of the materials in this formation. In addition to the waves arriving over paths K another wave reaching the point D will traverse the indirect path SRD, being reflected at the point R in the boundary surface between the formations B and C. On arriving at the point D, this reflected wave also will actuate the detector.

Figure 2:
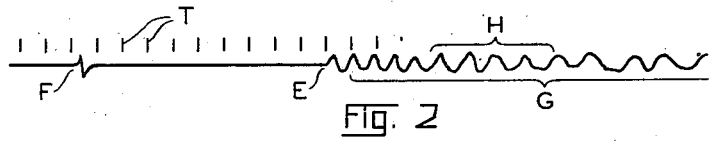
Fig. 2 illustrates the character of the record made at the receiving point of waves in Fig. 1.

If the detector at D is connected to a recorder of the conventional oscillograph type, the seismic waves arriving at D will be recorded as shown in Figure 2. In this Figure, time progresses along the record in a left-to-right direction and small uniform intervals of time, say 0.01 second, are denoted by the lines T. The time of origin of the seismic wave at S is coincident with the time of firing of the explosive at that point. This time is transmitted to the recorder, by means well known in the art, and produces the break in the record trace at F. One of the direct paths K is known as the brachistrochronic path, or shortest time-path. The wave traversing this path will arrive at the point D before any of the other waves arrive, and, of course, will be the first wave recorded, as at E in Figure 2. Subsequently, a number of other waves will arrive over numerous paths K and will be recorded in the region G. In general, the reflected wave arriving at the point D will be greatly attenuated due to a large amount of absorption and dispersion over the longer path SRD as well as to the fact that all of the energy incident at the point R may not be reflected. Consequently, when the weakened reflected wave arrives at D and is recorded somewhere in the region H, for instance, of Figure 2, it is so obscured by the superimposed direct travelling waves of larger magnitude that it is extremely difficult, if not impossible, to identify. Hence, the method shown in Figure 1 is sometimes impractical.

Figure 3:
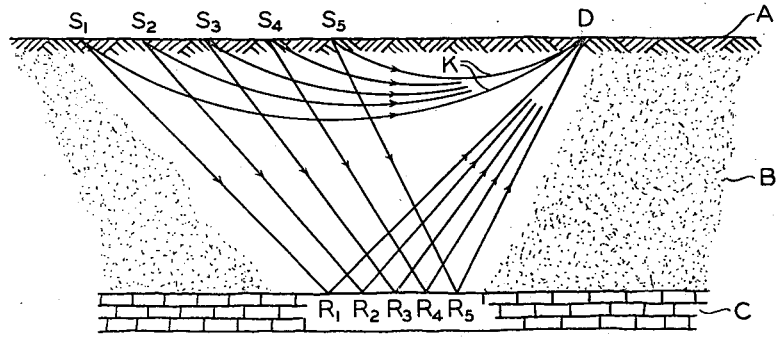
Fig. 3 illustrates the direct and indirect paths taken from a plurality of sources of waves to a receiving point.
Figure 4:
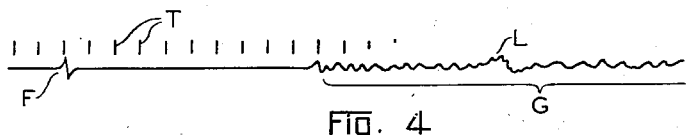
Fig. 4 illustrates the record made at the receiving point on the arrangement of Fig. 3.

An attempt has been made to overcome the defect inherent in this method employing one source by the use of a plurality of sources $S_1 \ldots S_5$, spaced apart, as shown in Figure 3. The principle of this method is that by simultaneously firing the sources $S_1 \ldots S_5$, which are spaced so that the distance between $S_1$ and $S_5$ is at least equal to one half the predominating wave length in the region G of Figure 2, the algebraic sum of the wave displacements arriving at D over the direct paths K will be small as compared to the effect of a single source, as in Figure 1. On the other hand, the reflected waves traversing the paths $S_1 R_1 D \ldots S_5 R_5 D$ will be somewhat cumulative in effect if the difference in length between the shortest and longest paths does not exceed one quarter the wave length of the reflected energy. Herein lie the limitations of this method. In general when a sufficient number of sources $S_1 \ldots S_5$, are correctly spaced to sufficiently minimize the effect of the direct travelling waves, the difference between the shortest and longest paths of the reflected waves has closely approached one quarter wave length of the reflected waves, if it has not exceeded this value. The result is a record somewhat as shown in Figure 4. Here, it will be noted, the amplitude of the direct waves in the region G has been diminished and a vague reflected wave having an indefinite point of beginning is shown at L.

A method of avoiding the limitations inherent in the arrangement shown in Figure 3 is the essence of my invention. This is accomplished by means of the method and apparatus diagrammatically shown in Figure 5. Here, instead of firing the shots $S_1 \ldots S_5$ simultaneously, I fire them in such time sequence that the reflected waves arrive at the point D simultaneously so that their algebraic sum is a maximum while the algebraic sum of the direct travelling waves is minimized due to interference as they arrive at D at random intervals over a large number of paths. This results in a record as shown in Figure 7 where it will be noted that the recorded effect of the reflected waves simultaneously arriving at D stands out quite definitely at L, and that the direct travelling waves in the region G do not interfere with a definite initial deflection at Z.

The reflected waves from the various sources, $S_1 \ldots S_5$, are made to arrive at D simultaneously as follows: $S_1$, for example, is fired at an interval of time previous to the firing of $S_5$ such that at the instant $S_5$ is fired the seismic wave from $S_1$ will have progressed to the position $P_1$, which is distant from $S_1$ by an amount such that $P_1R_1D=S_5R_5D$. Then, if the velocity of the waves along the two paths, $P_1R_1D$ and $S_5R_5D$, are equal, the waves will arrive at D simultaneously. In general, the velocities along these paths will be found to be different, however, and a final determination of the interval of time between the firing of $S_1$ and $S_5$ will be made empirically. The time at which the sources $S_2$, $S_3$, and $S_4$ are to be fired will be determined in a similar manner.

Various apparatus, such as a contacting pendulum or a commutator device, may be used for firing the shots $S_1 \ldots S_5$ in the correct sequence. I prefer a commutator and have diagrammatically shown such a device in Figure 5. This device consists of a yoke 1 supporting a plurality of brushes 2 which are capable of being adjusted circumferentially on the yoke by means of the slots 3 and screws 4. The brushes bear upon a commutator 5 which rotates with constant velocity and has a contacting segment 6. The shaft 7 which carries the commutator 5 also carries the commutator 8, shown in detail in Figure 6. The commutator 8 has a spiral conducting segment 9 mounted in a groove between threads 10. A brush 11 which rides in the groove contacts with the segment 9 during one revolution of the commutator. The segments 9 and 6 of the two commutators are electrically connected and the commutators are so adjusted on the shaft 7 that brush 11 just makes contact with the segment 9 when segment 6 is in the position shown in Figure 5. This assures that, when a source of voltage 12 is connected to brush 11 and to one of the leads of each of the blasting caps 15 and the brushes 2 are connected to the other leads as shown, the shots $S_1 \ldots S_5$ will be fired in the correct order when the commutators rotate in a counter clockwise direction as shown in Figure 5. While the commutators are rotating, and until it is desired to fire the shots, the brush 11 normally rides in groove 13. Then, when the commutators are rotating at the correct speed and it is desired to fire the shots, the brush 11 is shifted laterally and moved over into the groove between threads 10. For simplicity, I have shown a manual means 14 for shifting the brush but it will be obvious that other electrical or mechanical means may be devised by those skilled in the art.

It will also be obvious to those skilled in the art that my method is not dependent on any particular type of seismic wave detecting and recording apparatus; as, for instance, the detector 15' may be any type of electromagnetic or microphonic detector of seismic waves, such, for example, as that shown in Figure 11 of my Patent Reissue No. 17,242.

Likewise the recorder 16 to which detector 15' is connected may be any of the conventional oscillograph type of recorders now used, in the seismic art.

In Figure 7 I have shown only one firing break F. This will indicate the time of firing of any one of the shots $S_1 \ldots S_5$ to which the recorder 16 may be connected and the relative time of firing of the other shots will be known from the speed of rotation of the commutator 5 and the position of the brushes 2. However, the recorder 16 may be connected in series with brush 11 and source of voltage 12 by means of transformer 17, and thus record the time of firing of each of the shots $S_1 \ldots S_5$. This results in a plurality of breaks F from which the relative time of firing of each of the shots may be directly obtained.

Having recorded the time of origin of the seismic wave at each of the points $S_1 \ldots S_5$ and the time of arrival of the reflected waves at the point D, I next determine the velocity of a seismic wave in the formation B by means well known in the art of seismology. From this data I am able to compute the lengths of the paths $S_1R_1D \ldots S_5R_5D$. Then, knowing the position of points $S_1 \ldots S_5$ and D, I can determine the loci of the points of reflection $R_1 \ldots R_5$, by graphic or algebraic methods known to those versed in the art. I next determine the loci of other points of reflection by additional setups similar to that shown in Figure 5, and from this data the profile and depth of the reflecting surface is developed.

While I have shown the sources $S_1 \ldots S_5$ in line in Figure 5, it is obvious that this arrangement is not strictly essential and that these points may be laterally offset within limits as shown in Figure 8. Another obvious modification consists in the use of a plurality of detectors arranged substantially equidistant from the shots as shown at $D_1 \ldots D_5$, and connected in series. This arrangement has the effect of increasing the response from the shots and at the same time reducing the effect of stray ground noises by algebraic superposition.

Still another modification of my invention consists in burying the charges of explosive at the points $P_1 \ldots P_4$ rather than at $S_1 \ldots S_4$. This would eliminate the necessity for firing the shots in sequence and would make simultaneous firing possible. However, in most instances, the excessive depth at which the shots farthest from the detectors, as for example, $S_1$ and $S_2$, would have to be buried renders this modification seldom practicable.

In addition to the modifications which I have described, other modifications within the scope of the subjoined claims will appear to those skilled in the art of seismology.

I claim:

1. In the art of profiling geological formations, the step in the method which consists in originating a plurality of seismic waves above said formation at spaced points and at times to enable the individual waves to be reflected from said formation to arrive simultaneously at a common detecting point.

2. In the art of profiling geological formations, the method which consists in originating a plurality of seismic waves above said formation at spaced points and at times to enable the individual waves to be reflected from said formation to arrive simultaneously at a common point, recording the time of origin of each separate wave, and recording the simultaneous arrival of said reflected waves.

3. In the art of profiling a geological formation, the method which consists in locating a plurality of explosive charges at spaced points above said formation, firing said charges at times enabling the waves created thereby to be reflected from said formation to arrive substantially simultaneously at a common point and operating a detector at said common point by the reflected waves.

4. In the art of profiling a geological formation, the method which consists in locating a plurality of explosive charges at spaced points above said formation, firing said charges at times enabling the waves created thereby to be reflected from said formation and arrive substantially simultaneously at a common point, and operating a detector at said common point by the waves coming directly from the charges and by the reflected waves.

5. In a system for profiling geological formations, a plurality of charges located at spaced points above the formation to be profiled, a detector located at a point remote from said charges, and means for firing said charges at separate predetermined times to enable the waves reflected from said formation to reach the detector simultaneously.

6. In a system for profiling geological formations, a plurality of charge located at spaced points above the formation to be profiled, a detector located at a point remote from said charges, and means for firing said charges at separate predetermined times to enable the waves reflected from said formation to reach the detector simultaneously, and means to transmit the time of firing to said detector.

7. In the art of profiling a geological formation which consists in originating seismic waves at a plurality of spaced points adjacent the earth's surface at spaced time intervals, locating a detector at the earth's surface remote from said points, repeating the origination of the seismic waves at said points at different time intervals until a maximum indication is received at the detector from the waves reflected from said formation and recording the lapse of time between the times of origin of said waves and the reception of said maximum indication.

8. In a system for profiling geological formations, a plurality of charges located at spaced points adjacent the earth's surface, a detector located at a point remote from said charges, electrical means for firing said charges, switch contacts adapted to connect said means to said charges, and means for varying the times of operation of said switches to cause the waves produced by the firing of said charges and reflected from said formation to simultaneously reach the detector.

In testimony whereof I have signed my name to this specification this 5th day of July 1931.

BURTON McCOLLUM.